United States Patent
Le Guillou et al.

(10) Patent No.: US 11,310,111 B2
(45) Date of Patent: Apr. 19, 2022

(54) METHOD FOR CONFIGURING A FIREWALL EQUIPMENT IN A COMMUNICATION NETWORK, METHOD FOR UPDATING A CONFIGURATION OF A FIREWALL EQUIPMENT, AND CORRESPONDING DEVICE, ACCESS EQUIPMENT, FIREWALL EQUIPMENT AND COMPUTER PROGRAMS

(71) Applicant: ORANGE, Issy-les-Moulineaux (FR)

(72) Inventors: Xavier Le Guillou, Chatillon (FR); Dimitri Bricheteau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/329,731

(22) Filed: May 25, 2021

(65) Prior Publication Data

US 2021/0367842 A1 Nov. 25, 2021

(30) Foreign Application Priority Data

May 25, 2020 (FR) ...................................... 2005505

(51) Int. Cl.
*G06F 15/177* (2006.01)
*H04L 41/0816* (2022.01)
*H04L 41/084* (2022.01)
*H04L 41/08* (2022.01)
*H04L 41/0893* (2022.01)
*H04L 29/06* (2006.01)

(52) U.S. Cl.
CPC ...... *H04L 41/0816* (2013.01); *H04L 41/0843* (2013.01); *H04L 41/0886* (2013.01); *H04L 41/0893* (2013.01); *H04L 63/0263* (2013.01)

(58) Field of Classification Search
CPC ............ H04L 41/0816; H04L 41/0843; H04L 41/0886; H04L 41/0893; H04L 63/0263
See application file for complete search history.

(56) References Cited

U.S. PATENT DOCUMENTS

2016/0156591 A1* 6/2016 Zhou ................... H04L 63/0263 726/13
2018/0176261 A1 6/2018 Bansal et al.
(Continued)

OTHER PUBLICATIONS

French Written Opinion dated Jan. 14, 2021 for corresponding French Application No. 2005505, filed May 25, 2020.
(Continued)

*Primary Examiner* — Wing F Chan
*Assistant Examiner* — Joseph R Maniwang
(74) *Attorney, Agent, or Firm* — David D. Brush; Westman, Champlin & Koehler, P.A.

(57) ABSTRACT

A method for configuring a firewall equipment in a first communication network managed by an access equipment for accessing a second communication network. Such a method implements: obtaining characteristic information of a user equipment in the first network by analyzing its active interfaces in the network; generating configuration rules for configuring the firewall equipment on the basis of the obtained features and of a predetermined configuration model; and transmitting, to the firewall equipment, an update command message to update a configuration, including the determined configuration rules.

16 Claims, 5 Drawing Sheets

(56) References Cited

U.S. PATENT DOCUMENTS

2020/0304469 A1* 9/2020 Reimer ............... H04L 43/0876
2021/0320903 A1* 10/2021 Kalaycilar .............. H04L 43/06

OTHER PUBLICATIONS

Haining Chen et al., "Tri-Modularization of Firewall Policies", Symposium on Access Control Models and Technologies, ACM, 2 Penn Plaza, Suite 701 New York NY 10121-0701 USA, Jun. 6, 2016 (Jun. 6, 2016), pp. 37-48, XP058260335.
French Search Report and English translation of French Written Opinion dated Dec. 23, 2020 for corresponding French Application No. 2005505, filed May 25, 2020.

* cited by examiner

[Fig. 1]
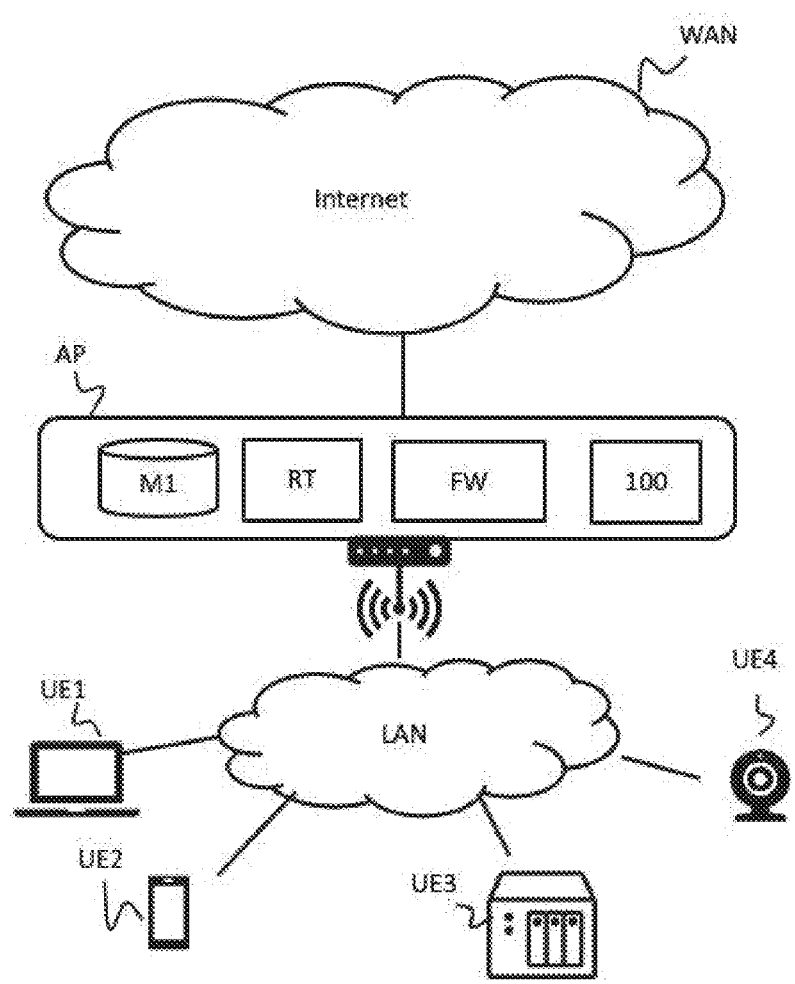

[Fig. 2]
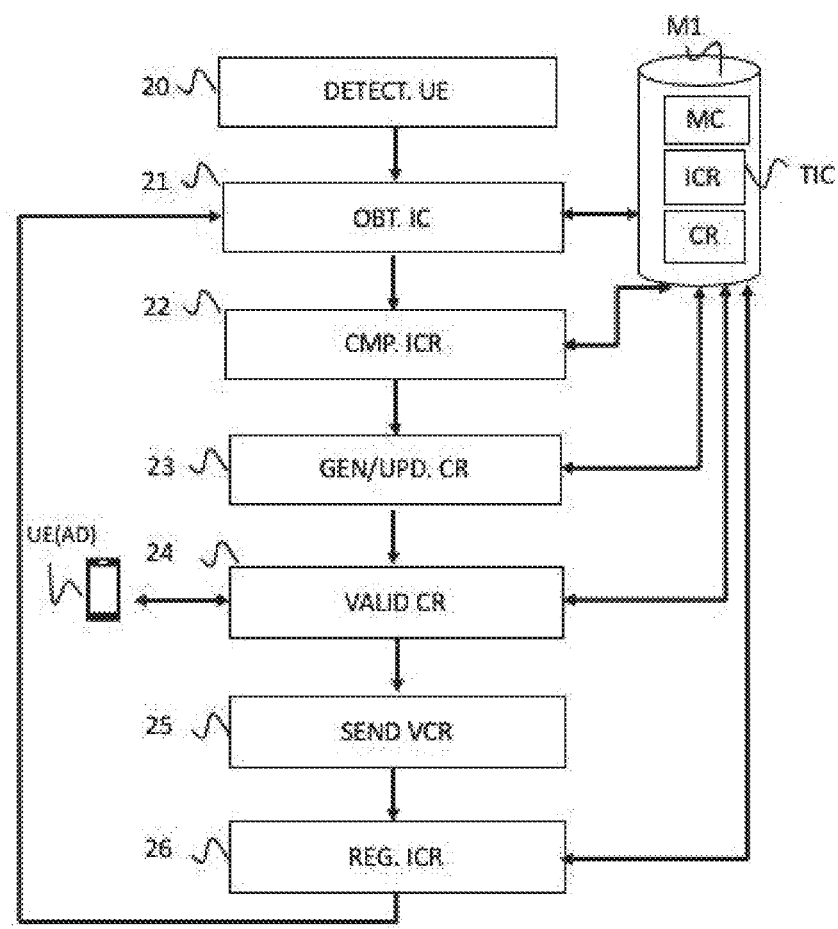

[Fig. 3]
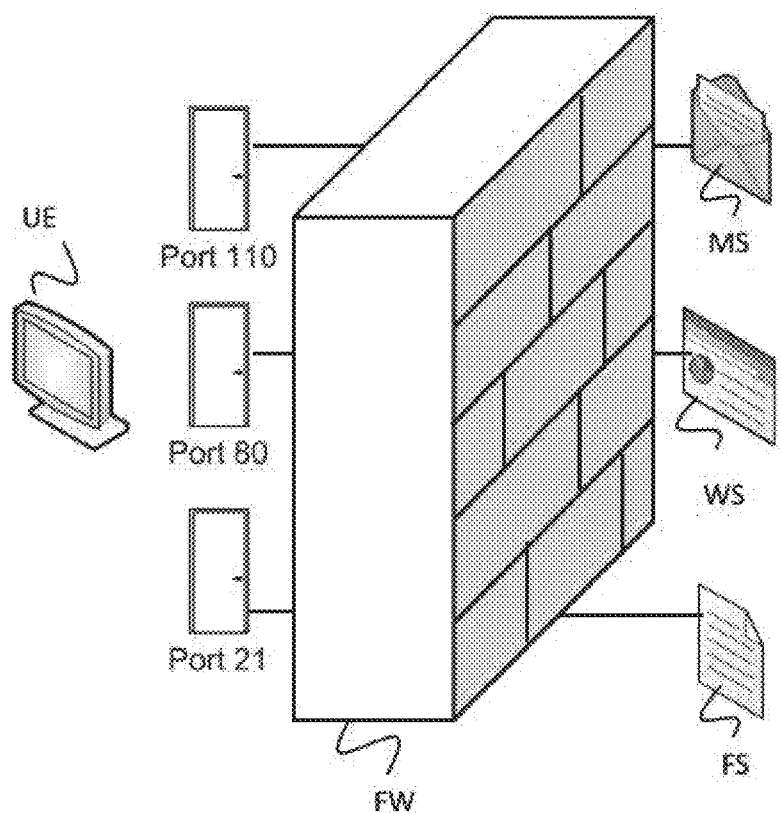
[Fig. 4]
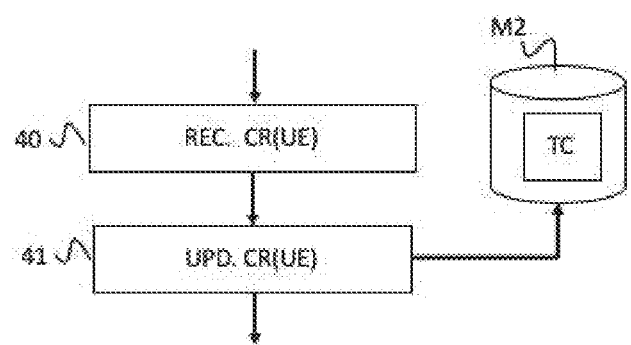

[Fig. 5]
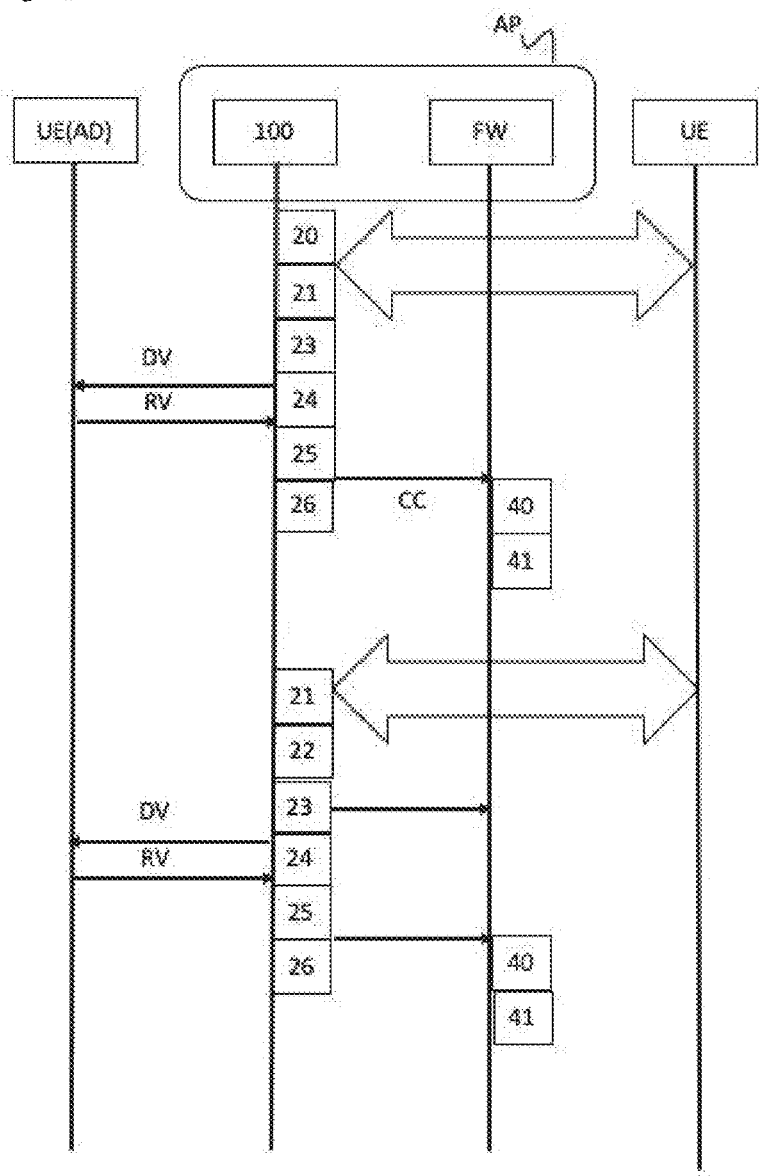
[Fig. 6]
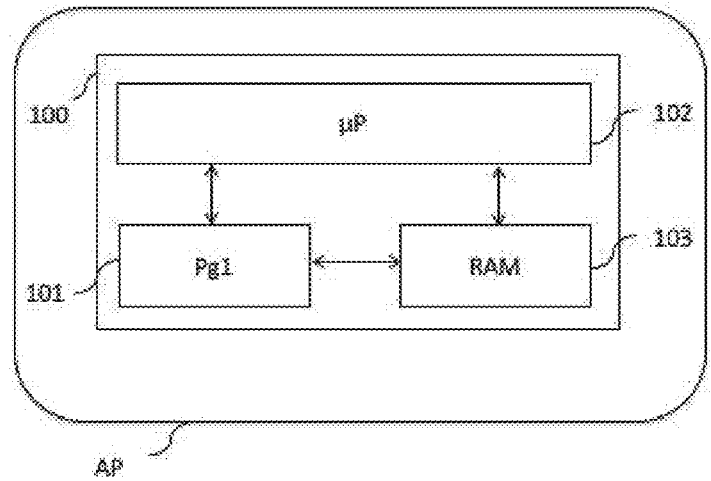

[Fig. 7]
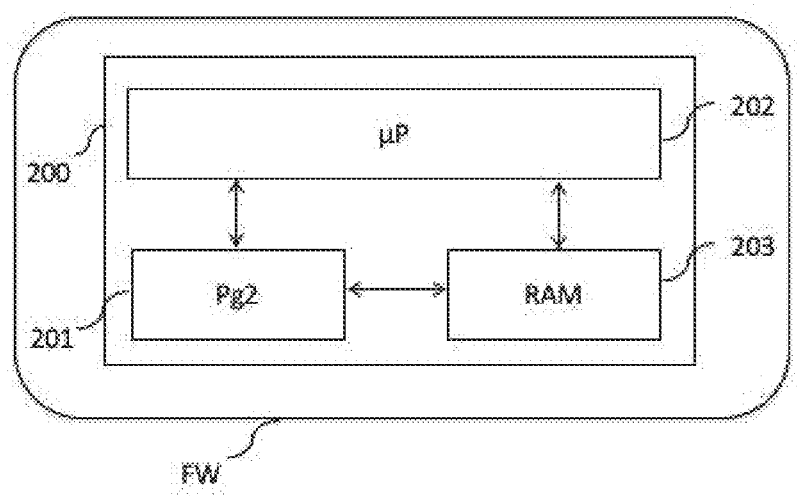

METHOD FOR CONFIGURING A FIREWALL EQUIPMENT IN A COMMUNICATION NETWORK, METHOD FOR UPDATING A CONFIGURATION OF A FIREWALL EQUIPMENT, AND CORRESPONDING DEVICE, ACCESS EQUIPMENT, FIREWALL EQUIPMENT AND COMPUTER PROGRAMS

TECHNICAL FIELD OF THE INVENTION

The field of the invention is that of the security of a communication network, more precisely of the configuration of a firewall equipment in such a network.

The invention is applicable in particular to a local area communication network, for example a wireless one, managed by an access equipment for accessing a wide area communication network, for example the Internet.

PRIOR ART

A firewall equipment is an important element in the security of a computer network, since it makes it possible to apply an access policy for accessing the resources of this network. Its main task is that of controlling data traffic between the network that it protects and other networks, by filtering data flows transiting through it. It is generally placed in a home or business local area communication network, intercepting the whole flow of data traffic with a wide area network, such as the Internet.

The firewall filters data packets in accordance with various criteria. The most common ones are:
- the origin or the destination of the packets (IP address, TCP or UDP port, network interface, etc.);
- the options contained in the data (fragmentation, validity, etc.);
- the data themselves (size, correspondence to a pattern, etc.).

A firewall often acts as router and thus makes it possible to form multiple secure zones, called demilitarized zones or DMZ, in the network that it protects. These zones are separated in line with the level of trust afforded to them by the administrator of the network.

There are multiple types of firewall, for example stateless firewalls that do not take into account the state of communication between the source equipment and the client equipment receiving the data traffic that it processes, and stateful firewalls that, on the contrary, apply filtering rules that depend on a state of this communication, this being based for example on a TCP (for "Transmission Control Protocol") connected mode communication protocol.

Regardless of the type of firewall, configuring it is a delicate but still strategic task. Specifically, without a firewall, a host equipment is extremely vulnerable to all sorts of attacks via the network to which it is connected. It may even be subjected to an attack in the first few seconds after it connects to the Internet. Good protection of the host equipment connected to a local area network of an access equipment for accessing the Internet is therefore essential.

However, it is important to define suitable configuration rules, that is to say that are neither too strict nor too lax. With excessively strict firewall rules, the client equipment is more resistant to attacks, but this resistance is obtained at the expense of the one or more services deployed by this client equipment, the operation of which may be worsened by these rules.

This configuration problem is very particularly pronounced for firewalls embedded in home gateways that are configured so as both to manage a local area communication network and to route the data traffic with an Internet-type wide area communication network. Its configuration of the firewall of an Internet gateway is performed manually, but requires knowing all of the features of the host equipment connecting to its local area network. However, an administrator user of this network does not necessarily have a level of computing knowledge sufficient to obtain such features or to choose the appropriate configuration rules.

There are also a few predefined configuration modes, but these only allow a configuration of the firewall that is global to all of the services deployed by the host equipment. For example, such predefined configuration modes comprise:
- a "deactivated" mode, in which the firewall is inactive;
- a "medium" mode, in which the firewall blocks all incoming data traffic and authorizes all outgoing data traffic; and
- a "strong" mode, in which the firewall blocks all incoming data traffic and all outgoing data traffic.

This global and fixed configuration does not make it possible to adapt to the specific features of a particular host equipment connecting to the local area communication network.

There is therefore a need for a solution for facilitating customized configuration of a firewall in a local area communication network.

The invention aims to improve the situation.

Presentation of the Invention

The invention meets this need by way of a method for configuring a firewall equipment in a first communication network managed by an access equipment for accessing a second communication network, characterized in that it implements:
- obtaining characteristic information of the user equipment in said first network by analyzing its active interfaces in said network;
- generating at least one configuration rule for configuring the firewall equipment on the basis of the obtained features and of a predetermined configuration model; and
- transmitting, to the firewall equipment, an update command message to update a configuration, comprising said at least one generated configuration rule.

The invention proposes an entirely novel and inventive approach for configuring a firewall equipment in a first network, such as a home network or a private company network, based on observing characteristics of a user equipment connected to the first network in order to automatically generate configuration rules for configuring the firewall equipment, adapted to the hardware and software configuration of this user equipment and to its behavior in the first network. In contrast to the prior art, which allows only a completely manual configuration beyond the ability of a computing novice or, conversely, a few predefined configuration modes, the invention automatically adapts the configuration of the firewall to the user equipment connected to the first network and takes into account its behavior in this first network. The fact that these configuration rules are in accordance with a predetermined security model or policy guarantees a high security level for the user equipments connected to the first network and accessing the second network via the access equipment.

According to one aspect of the invention, the obtaining of characteristic information is triggered upon detecting arrival of the user equipment in the first network.

One advantage is that of automating the configuration of the firewall for a new user equipment.

According to another aspect of the invention, the obtaining of characteristic information of a user equipment connected to said first network, called current characteristic information, is triggered regularly.

One advantage is that of continuously monitoring the first network, thereby making it possible to adapt the configuration of the firewall to any change in behavior of the user equipment.

According to yet another aspect of the invention, the characteristic information of at least one active interface of this user equipment in the first communication network comprises at least one item of information representative of server software, called service, executed by said user equipment on said active interface and of a port opened by said service, and the generated configuration rule defines the network, from among the first network and the second network, on which the service is made accessible.

One advantage is that of achieving a tailored configuration for each service implemented by the user equipment.

According to yet another aspect of the invention, said obtained characteristic information furthermore comprises at least one network address that has accessed said service, and the generated configuration rules comprise a network address filtering rule determined on the basis of the predetermined configuration model and of said network address.

One advantage is that of taking into account the effective data traffic from and/or to the user equipment, in addition to the model, in order to define more suitable rules.

According to yet another aspect of the invention, the method implements preliminary validation of the generated configuration rules with an administrator of the first communication network before they are transmitted to the firewall equipment.

One advantage is that of giving the administrator the opportunity to adjust or to correct certain rules according to his wishes.

Advantageously, the validation implements transmission of a validation request and reception of a validation response via a human/machine interface of a user equipment of said administrator connected to said first communication network.

For example, the validation request formulates closed questions to the administrator in natural language, and the received responses make it possible to validate or invalidate each of the generated configuration rules.

According to yet another aspect of the invention, the method implements storage of the characteristic information obtained for the user equipment in memory in the form of reference characteristic information.

One advantage is that of making it possible to keep track of the state of the user equipment when it arrives in the network and thus of being able to detect a change in behavior of the equipment, following a new collection of characteristic information.

According to another aspect of the invention, the method implements a comparison of the current characteristic information with the reference characteristic information, and the generation of configuration rules is triggered upon detecting a difference between the current characteristic information and the reference characteristic information.

One advantage is that of updating the configuration rules only when necessary.

According to yet another aspect of the invention, when the difference relates to characteristic information representative of activation of a new interface, at least one additional configuration rule relating to said active new interface is generated and the update command message comprises said at least one additional rule where strictly necessary.

One advantage is that of limiting the extent of the configuration changes to the firewall.

According to yet another aspect, when the difference relates to characteristic information representative of deactivation of an interface, the update command message comprises a command to erase the at least one configuration rule relating to the deactivated interface.

One advantage is that of not overloading the memory of the firewall with configuration rules that have become obsolete.

The invention also relates to a computer program product comprising program code instructions for implementing a method for configuring a firewall equipment according to the invention as described above when it is executed by a processor.

The invention also targets a computer-readable recording medium on which the computer programs as described above are recorded.

Such a recording medium may be any entity or device capable of storing the program. For example, the medium may contain a storage means, such as a ROM, for example a CD-ROM or a microelectronic circuit ROM, or else a magnetic recording means, for example a USB key or a hard drive.

On the other hand, such a recording medium may be a transmissible medium such as an electrical or optical signal, which may be routed via an electrical or optical cable, by radio or by other means, such that the computer program that it contains is able to be executed remotely. The program according to the invention may in particular be downloaded from a network, for example the Internet.

As an alternative, the recording medium may be an integrated circuit in which the program is incorporated, the circuit being designed to execute or to be used in the execution of the abovementioned configuration method.

The invention also relates to a configuration device for configuring a firewall equipment in a local area communication network managed by an access equipment for accessing a wide area communication network.

Such a device is configured so as to:
obtain characteristic information of a user equipment connected to the first network by analyzing active interfaces of this user equipment in the first communication network; and
generate at least one configuration rule for configuring the firewall equipment on the basis of the obtained features and of a predetermined configuration model; and
transmit, to the firewall equipment, an update command message to update a configuration, comprising said at least one determined configuration rule.

Advantageously, said device is configured so as to implement the method for configuring a firewall equipment according to its various embodiments.

Advantageously, said device is integrated into an access equipment for accessing a second communication network, configured so as to manage a first communication network, said first network comprising a firewall equipment. This is for example a home gateway or business gateway.

The abovementioned corresponding access equipment, configuration device and computer program have at least the same advantages as those conferred by the abovementioned method according to the various embodiments of the present invention.

In correlation, the invention relates to a method for updating a configuration of a firewall equipment in a first communication network managed by an access equipment for accessing a second communication network.

According to the invention, such a method implements:
- receiving an update command message to update a configuration, comprising configuration rules associated with a user equipment present in the first communication network; and
- updating the configuration of the firewall equipment in accordance with the received command.

According to the invention, the firewall equipment is designed to take into account the configuration rules generated by the abovementioned configuration device and to apply them.

The invention also relates to a computer program product comprising program code instructions for implementing a method for updating a configuration of a firewall equipment according to the invention as described above when it is executed by a processor.

The invention also targets a computer-readable recording medium on which the computer programs as described above are recorded.

Such a recording medium may be any entity or device capable of storing the program. For example, the medium may contain a storage means, such as a ROM, for example a CD-ROM or a microelectronic circuit ROM, or else a magnetic recording means, for example a USB key or a hard drive.

On the other hand, such a recording medium may be a transmissible medium such as an electrical or optical signal, which may be routed via an electrical or optical cable, by radio or by other means, such that the computer program that it contains is able to be executed remotely. The program according to the invention may in particular be downloaded from a network, for example the Internet.

As an alternative, the recording medium may be an integrated circuit in which the program is incorporated, the circuit being designed to execute or to be used in the execution of the abovementioned method for updating a configuration.

Advantageously, such a method is implemented by a firewall equipment in a first communication network managed by an access equipment for accessing a second communication network.

Such a firewall equipment is configured so as to:
- receive an update command message to update a configuration, comprising at least one configuration rule associated with a user equipment present in the first communication network; and
- update the configuration of the firewall equipment in accordance with the received configuration rules.

Advantageously, the firewall equipment is integrated into the abovementioned access equipment.

BRIEF DESCRIPTION OF THE FIGURES

Other aims, features and advantages of the invention will become more clearly apparent upon reading the following description, given by way of simple illustrative and non-limiting example with reference to the figures, in which:

FIG. 1: shows one example of an architecture of a local area communication network managed by an access equipment for accessing a wide area communication network, when this access equipment comprises a firewall equipment and a configuration device for configuring this firewall equipment, according to one embodiment of the invention;

FIG. 2: describes, in the form of a flowchart, the steps of a method for configuring a firewall equipment in a local area communication network, according to one exemplary embodiment of the invention;

FIG. 3: schematically shows one example of a firewall equipment placed as to intercept the whole flow of data traffic from or to a user equipment connected to the local area communication network of an access equipment for accessing a wide area communication network;

FIG. 4: describes, in the form of a flowchart, the steps of a method for updating a configuration of a firewall equipment in a communication network, according to one exemplary embodiment of the invention;

FIG. 5: schematically illustrates the message flows exchanged between a configuration device according to the invention, a firewall equipment and a user equipment of an administrator of the local area network according to one exemplary embodiment of the invention;

FIG. 6: schematically illustrates the hardware structure of a configuration device for configuring a firewall equipment in a communication network according to one embodiment of the invention; and FIG. 7: schematically illustrates the hardware structure of a device for updating a configuration of a firewall equipment in a communication network according to one embodiment of the invention.

DETAILED DESCRIPTION OF THE INVENTION

The general principle of the invention is based on obtaining characteristic information of a user equipment detected in a first communication network managed by an access equipment for accessing a second communication network and on automatically generating configuration rules for configuring a firewall equipment of this network, in order to protect this user equipment, based on the obtained characteristic information. Advantageously, in a guided configuration mode, an administrator of the network is asked to validate the configuration rules before they are transmitted to the firewall equipment.

The invention thus makes it possible to assist the administrator of a first communication network managed by an access equipment for accessing a second network by performing a tailored configuration of his firewall equipment when necessary, for example when a new user equipment connects to the network or else when it changes behavior.

The invention is applicable to any type of communication network, in particular to a wireless communication network, managed by an access equipment for accessing a wide area communication network, for example the Internet. It is also applicable to two wireless or wired local area networks connected by a router, such as for example two independent subnetworks of one and the same company network.

Such an access equipment is for example a home gateway or a business gateway.

A presentation is now given, with reference to FIG. 1, of a local area communication network LAN managed by an access equipment AP for accessing a wide area communication network WAN, such as for example the Internet. The local area communication network LAN is for example a wireless network based on a technology such as Wi-Fi®, Bluetooth®, ZigBee, Z-Wave®, etc.

The access equipment AP is for example a home gateway or a business gateway. Such an access equipment AP therefore has an embedded router module RT configured so as to route data packets from the local area network LAN to the remote network WAN and vice versa.

The local area communication network LAN also comprises a firewall equipment or module FW, for example of "netfilter" type. Such a firewall runs in a Linux operating system and is based on tables "iptables" comprising rules for filtering data packets that transit via the router RT.

In this exemplary embodiment, it is integrated into the access equipment AP, but the invention is also applicable when the firewall FW is an equipment independent of the access equipment AP. The role of such a firewall is to control access to the resources of the local area communication network LAN by equipment external to the local area network. In particular, such a firewall generally performs a port redirection or NAT (for "Network Address Translation") function, which allows user equipment of a local area communication network LAN to access the wide area network, for example the Internet, with the address of the router. On the other hand, the firewall also performs a port redirection (or "Port forwarding") function, which makes it possible to access a machine of the network LAN from the wide area network WAN, for example when it implements a service on a port YY. To this end, a rule of the firewall redirects the port XX of the router to the port YY of this machine. Just one port is redirected: the final destination of the other requests destined for other ports is the firewall of the access equipment, and they do not access the user equipment of the local area network.

With reference to FIG. 1, consideration is also given to user equipment UE1-UE4, which will also be referred to as host equipment, configured so as to connect to the wide area communication network WAN via the local area communication network LAN and to host services intended for their users. This involves any equipment of a user that is capable of connecting to a communication network, such as for example a laptop computer UE1, a tablet (not shown) or a smartphone UE2. This may also involve a communicating object forming part of the Internet of Things or IoT, such as an NAS (for "Network Attached Storage") networked storage server UE3, a sensor (not shown), a camera UE4, etc. Generally speaking, consideration is given here to any user equipment capable of accessing the wide area network WAN via the local area communication network LAN and of jeopardizing the security of this network.

According to this exemplary embodiment of the invention, the access equipment AP comprises a configuration device 100 for configuring the firewall equipment FW. Such a device is configured so as to detect the presence of a new user equipment UE1-UE4 in the local area communication network LAN, obtain characteristic information of this user equipment and of the services that it hosts by analyzing its active interfaces in the network, generate a plurality of configuration rules for configuring the firewall equipment on the basis of the obtained characteristic information and transmit the plurality of rules to the firewall equipment. The obtained characteristic information is advantageously stored in a memory M1 of this device 100, in association with an identifier of the new user equipment UE1-UE4.

Thus, according to the invention, the firewall equipment is no longer configured manually or based on a few predefined configuration modes, but it receives specific configuration rules for each new user equipment that has connected to the local area communication network LAN.

Advantageously, the device 100 thus implements a method for configuring a firewall equipment in a local area communication network managed by an access equipment for accessing a wide area communication network according to the invention that will now be detailed with reference to FIG. 2.

In this exemplary embodiment of the invention, a new user equipment UE is detected at 20 in the local area communication network LAN. For example, the device 100 receives a notification from the access equipment AP, which has received a discovery request from a DHCP server broadcast by the user equipment UE or a request to connect to the local area network LAN based on an IP address already obtained by this user equipment. Indeed, the access equipment is configured so as to monitor the data traffic in the local area network LAN. Optionally, it may have obtained information directly from the DHCP server.

At 21, the device 100 obtains characteristic information IC of this user equipment by analyzing the active interfaces of this user equipment in the local area network and the data flows transiting via these interfaces. Active interfaces is the name given to the interfaces that the user equipment activates in order to connect to the local area network and connect the computer programs running on one of its processors with other computer programs running on other machines of the local area network or of the wide area network. Such an interface is characterized in particular by a type of connection that is used as communication medium, for example a wired link, wireless link, a particular wireless technology, etc. It is also distinguished by the ports that this user equipment has opened on such a medium to communicate with computer programs or remote software. Specifically, this remote software, as the case may be, listens for or transmits information on these ports. A port is distinguished by its number, which is coded on 16 bits. With the ports, the machine of a user equipment is able to execute multiple items of server software and even client software and server software at the same time. When client software wishes to dialog with server software, also called a service, it therefore needs to know the port being listened to thereby. Since the ports used by the services have to be known to the clients, the main types of service use ports that are said to be reserved. For example, as illustrated by FIG. 3, when a user equipment UE wishes to recover its email from a remote POP messaging server MS, its messaging client software listens to port 110, whereas, to consult an HTTP web server WS through a web browser, its web client browser uses port 80. Finally, it connects to a remote file-sharing server FS, for example an FTP (for "File Transfer Protocol") server, using port 21.

Advantageously, the analysis of the active interfaces of the user equipment by the device 100 is based on modules available in the access equipment AP. Specifically, the latter benefits from visibility of the data traffic exchanged in the local area network as well as that routed to or from the wide area communication network, and it is natively configured so as to collect information about this data traffic.

In particular, the access equipment collects information representative of dated network events that have occurred in its software or hardware modules, such as the firewall module FW for example, an IP address assignment server for example of DHCP (for "Dynamic Host Configuration Protocol") type, or even a DNS (for "Domain Name System") module for associating a domain name with an IP address in order to make it easier to access the host equipment on an IP network.

More generally, network event is the name given here to any dated event that gave rise to the recording, by software or an operating system of an equipment connected to the network, of a row in an event journal, called log engine. This is for example an access operation to the system, a modification of a file, a port opening request, packet traffic destined for a target IP address and a target port, an amount of information sent, etc.

The access equipment is configured so as to read the records in the event journals from its hardware and software modules, such as for example the following record, from a journal of the firewall module FW:
2019 Aug. 4 13:23:00 centos kernel: IPTables-Dropped: IN=em1 OUT=MAC=a2:be:d2:ab:11:af:e2:f2:00:00 SRC=193.252.19.3 DST=80.11.95.103 LEN=52 TOS=0x00 PREC=0x00 TTL=127 ID=9434 DF PROTO=TCP SPT=58428 DPT=443 WINDOW=8192 RES=0x00 SYN URGP=0.

It is also configured so as to read and analyze records in event journals supplied by hardware or software modules of the new user equipment and stored on the access equipment AP via a centralization system of syslog type, for example. A record from the journal of the Web client software of the user equipment may take the following form:
193.252.19.3-peter [9/Feb/2019:10:34:12-0700] "GET/ sample-image.png HTTP/2" 200 1479.

Advantageously, the access equipment AP is also equipped with probes, such as "tcpdump" data packet analyzers, for example, which intercept (or "sniff") data flows exchanged between the user equipment UE and the access equipment AP.

According to this exemplary embodiment of the invention, the characteristic information IC is extracted or even deduced from the collected records. It advantageously comprises characteristic information of a type of user equipment. This is for example:
- a network name declared by the terminal, for example to the DHCP server or in an IP connection request, such as "HP-DeskjetXXXX" for a printer or "YYYY's iPhone" for a mobile terminal;
- an identifier of the user equipment, for example an OUI (for "Organizationally Unique Identifier"), which is a 24-bit number assigned by the IEEE. This number uniquely identifies a manufacturer or an organization in a MAC connection address. This is generally the first 3 bytes of the MAC address. For example, the OUI "C8:9C:1D" denotes a professional equipment made by Cisco®, "D4:22:21" relates to a home equipment made by Sercomm®, "00:E0:4C" denotes a consumer personal computer made by Realtek® and "00:14:7C" denotes a business computer made by 3Com®.

It thus determines, based on the characteristic information relating to a type of this user equipment, such as for example the name of the user equipment and its OUI, whether this is a professional or consumer equipment.

Advantageously, the characteristic information also relates to:
- one or more interfaces for connecting the user equipment to the local area communication network, for example wired and/or wireless, Wi-Fi or Bluetooth or ZigBee or other interfaces;
- one or more items of client or server software running on a processor of the user equipment connected to the local area network;
- one or more ports opened on the local area network and/or on the wide area network by these one or more items of software. These are generally ports that are reserved and well known. For example, client software of a remote web server WS opens port 80 (http) and/or port 443 (https), client software of a remote email server MS opens port 110, client software of an FTP file-sharing server FS opens port 21, a Telnet client/server protocol based on TCP opens port 23 and an SSH (for "Secure Shell") communication service opens port 22. Advantageously, the access equipment AP collects records relating to the data traffic in the local area network over a predetermined time period, for example of a few minutes, so as to learn how the association (or "binding") between these services and ports of the user equipment has been made. In particular, the obtained characteristic information specifies whether the port is open:
- on the local area network or on the wide area network;
- in the incoming and/or outgoing direction.

Advantageously, the device 100 also obtains, from this collection of records relating to the data traffic, IP addresses outside the local area network that are authorized to communicate with the service in question, and determines whether this communication takes place in the incoming and/or outgoing direction.

For the server software, it finally checks whether the implementation of these services is consistent with the type of user equipment detected (consumer/business). Advantageously, it evaluates a risk level on the basis of the service. For example, a service such as Telnet, which makes it possible to remotely take control of a user equipment, associated with port 23, is considered to be risky, whereas the SSH service associated with port 22 is more secure.

The set of characteristic information IC forms a fingerprint that represents or signs the behavior of this client equipment in the network LAN at the time when it connects.

At 23, the device 100 uses the obtained information to generate configuration rules for configuring the firewall FW that are suited to the characteristics of the new user equipment UE. It applies a predefined configuration model MC.

According to a first option, this generation is automatic.

For example, in order for web client software to access the remote Web server, the device 100 generates a configuration rule for configuring the firewall that redirects port 80 (http) of the access equipment to port 80 of this server. This is written for example as follows:
iptables -t nat -A PREROUTING -p tcp --dport 80 -j DNAT --to-destination 123.123.123.123:80.

Advantageously, the characteristic information obtained by analyzing the traffic for a predetermined time period is used as follows, to generate configuration rules for configuring the firewall:
- a port that is not used for the predetermined time period is unpublished, by erasing the corresponding configuration rule for configuring the firewall;
- the source addresses authorized to access a port of the access equipment AP are specified explicitly and in a limited number. For example, the following rule authorizes only the IP address 12.12.12.12 to access the port 80 outside the access equipment AP:
iptables -A INPUT -p tcp -s 12.12.12.12 --dport 80 -j ACCEPT;
- the destination addresses authorized from a port of the access equipment AP are specified in the same way.

Optionally, at 24, the device 100 performs a preliminary validation of the configuration rules CR that it has generated with an administrator AD of the local area network LAN and the access equipment AP. For example, said administrator is connected to the network LAN on his user equipment UE(AD), for example the laptop computer UE1. A validation request message DV is addressed to him at $24_1$. It comprises at least one identifier of the user equipment UE and information representative of the plurality of configuration rules CR. Advantageously, this information comprises questions that translate each of the generated configuration rules into natural language. More precisely, these are closed questions for which the expected response is yes or no. Advantageously, such a message is processed by an application programming interface or API installed on the user equipment UE1 of the administrator and configured so as to receive the validation request message, extract the questions that it contains, present them to the administrator by displaying them on the screen of the user equipment UE1, recover the responses entered by the administrator AD on the keypad of his user equipment UE(AD), insert them into a response message RV and transmit it to the device 100.

At $24_2$, the device 100 extracts the responses received in the message RV and adapts the plurality of configuration rules accordingly. It obtains a plurality of validated configuration rules VCR.

At 25, it transmits, to the firewall equipment, a configuration command message CC comprising the plurality of validated rules VCR so that the latter updates its configuration table by including these configuration rules therein.

At 26, the device 100 stores the characteristic information IC obtained at 21 in memory M1 in the form of reference characteristic information ICR(UE) for the user equipment UE. According to this exemplary embodiment of the invention, the obtained characteristic information IC is of various types. For example, the name of the service, its version, the port opened for this service and lastly the IP addresses authorized to communicate with this service relate to a "service" type, whereas the declared name of the user equipment UE and its OUI identifier relate to a "declarative identity" type. The set of characteristic information may thus be represented by a structured data model.

Advantageously, a particular service is described by an instantiation of a service property of this data model whose fields or attributes comprise the name of the service, the one or more opened ports and optionally the version of the software and the one or more IP addresses authorized to communicate with this service. With regard to the declarative identity information, this is described by an instantiation of the "identity" property. For example, such a model is described in accordance with the XML (for "Extensible Markup Language") language. The reference characteristic information ICR of the new user equipment UE is stored for example in a file ICR(UE) that is organized in accordance with this data model.

As an alternative, the characteristic information is stored, in structured or unstructured form, in an entry in a table TIC, said entry being indexed using information identifying the user equipment, such as for example its MAC address or else its IP address.

A description is now given of a few specific examples of configuring a new user equipment UE in guided mode.

Example 1: Detecting a Computer (UE1) in Server Mode

At 21, the following characteristic information is obtained:
 a network name: "r-lnx-goldorak";
 an OUI identifier of the user equipment: "00:14:7C". The user equipment is a personal computer, desktop computer or a server equipment, whose network card is made by 3Com;
 a wired interface;
 a multitude of standard or reserved ports are open. These are characteristic of a server equipment.
 An audit of the ports opened by this user equipment made it possible to obtain the following additional information:
 the following ports are open: 20/21/22/23/25/53/80/110/ 123/145/443/873/993/995.

At 23, using this information allows the device 100 to establish that the user equipment is a server and that it has opened numerous services.

At 24, in a guided configuration mode, the following questions are asked to the administrator AD of the local area network LAN:
 A new user equipment has been detected: is it a server?
 The expected response is "yes" or "no".
 The server has numerous services. Would you like to place it in a demilitarized zone DMZ? This involves deploying a firewall module on the server.
 The expected response is "yes" or "no".
 An FTP file-sharing service is present on ports 20/21, would you like to publish it to the Internet? This involves assigning strong passwords to users. This service is also advised against since it allows data to transit in open form [ADVISED AGAINST]
 The expected response is "yes" or "no".
 An SSH communication service is present on port 22, would you like to publish it to the Internet?
 This involves assigning strong passwords to users.
 The expected response is "yes" or "no".
 A Telnet service is present on port 23. This service is strongly advised against, we would advise you to opt for an SSH service. Would you still like to publish it? [ADVISED AGAINST]
 The expected response is "yes" or "no".
 An SMTP service is present on port 25. Publishing such a service requires particular attention in order not to create email sending campaigns without recipients' consent, or spam. Would you still like to publish it?
 The expected response is "yes" or "no".
 etc.

Example 2: Detecting a Networked Storage Server (UE3) or NAS

At 21, the following characteristic information is obtained:
 Name of the user equipment: "srv-nas"=> network hard drive?
 OUI identifier: "00:11:32". The user equipment is a hard drive made by Synology Incorporated;
 Wired interface, representative of a server;
 multitude of standard ports open, representative of a server;
 ports open: 20/21/80/139/443/445.

At 23, the device 100 deduces from this that the user equipment is an NAS networked storage server and that it has 6 open ports.

At 24, in a guided configuration mode, the following questions are asked to the administrator AD of the local area network LAN:
 A new user equipment has been detected: is it a hard drive?
 The expected response is "yes" or "no".
 An FTP file-sharing service is present on ports 20/21, would you like to publish it to the Internet? This involves assigning strong passwords to users. This service is also advised against since it allows data to transit in open form [ADVISED AGAINST]
 The expected response is "yes" or "no".
 A web server is present on ports 80 (http) and 443 (HTTPS), would you like to publish it to the Internet? Warning, all information relating to your personal content could be accessible to anyone [ADVISED AGAINST]
 The expected response is "yes" or "no".
 A Samba file-sharing service has been detected on ports 139 and 445, would you like to publish it to the Internet? Warning, all your personal content could be accessible to anyone [ADVISED AGAINST]

The expected response is "yes" or "no".

Advantageously, the data traffic analysis has made it possible to highlight that some services were never used, hence the formulation of the following questions:

the Network Time Protocol or NTP, for synchronizing the local clock of computers to a reference clock via a computer network, is inactive. Would you like to keep it published?

If it has been detected that only some IP addresses managed to connect to certain services, the following question may be asked:

the remote file synchronization service rsync (for "Remote Synchronization") has been used only from addresses of the type 193.252.0.0/16 and 2.0.0.0/8. Would you like to restrict the IP addresses authorized to use this service?

If it has been detected that the firewall module FW of the access equipment has blocked a large number of requests on a particular port, it is necessary to ascertain whether they are actually destined for an equipment of the network LAN or whether they constitute an attack against this network. The following additional question is therefore asked:

a large number of requests have been detected on port 443 (web server in HTTPS secure mode) of the router of your home gateway. Have you forgotten to publish this service to the Internet?

Example 3: Detecting a Smartphone (UE2)

At 21, the following characteristic information is obtained:

Name of the user equipment: "pouetpouet". This is definitely a consumer equipment OUI identifier: "FC:FC:48". The user equipment is made by Apple Inc. It is an iPhone, an iPad or a Mac;

Wi-Fi interface;

a single port open for an Airplay multimedia content file-sharing service.

At 23, the device 100 deduces from this that the user equipment is a mobile telephone that is implementing a file-sharing service on a port.

At 24, in a guided configuration mode, the following questions are asked to the administrator AD of the local area network LAN:

A new user equipment has been detected: is it a personal computer?

The expected response is "yes" or "no".

Is it an Apple mobile telephone?

The expected response is "yes" or "no".

An Airplay service is present on ports 554/3689. Publishing this type of service to the Internet is strongly advised against in order that your content does not become accessible to everyone. Would you still like to publish the Airplay service to the Internet? [ADVISED AGAINST]

The expected response is "yes" or "no".

Example 4: Detecting a Camera UE4

At 21, the following characteristic information is obtained:

Name of the user equipment: "DSC-5030L".

OUI identifier: "FC:75:16". The user equipment is made by D-Link. This is a consumer equipment;

Interface: Wi-Fi;

four open ports 80 (TCP), 5001 (TCP and UDP), 5002 (TCP and UDP) and 5003 (TCP and UDP).

At 23, the device 100 deduces from this that the user equipment is a camera that is implementing an administration service on port 80, an audio streaming service on port 5002 and a video streaming service on port 5003, and an audio/video synchronization service on port 5001.

At 24, in a guided configuration mode, the following questions are asked to the administrator AD of the local area network LAN:

A new user equipment has been detected: is it a camera?

The expected response is "yes" or "no".

It is a D-Link camera?

The expected response is "yes" or "no".

A web server service is present on port 80. Publishing this type of service to the Internet is strongly advised against in order that your content does not become accessible to everyone. Would you still like to publish the Web service to the Internet? [ADVISED AGAINST]

The expected response is "yes" or "no".

A "complex link" service has been identified on port 5001. This service has not been formally recognized and we would advise you against publishing it to the Internet, unless you know exactly what you are doing. Would you still like to publish this service to the Internet? [ADVISED AGAINST]

The expected response is "yes" or "no".

An "rfe" service has been identified on port 5002. This service has not been formally recognized and we would advise you against publishing it to the Internet, unless you know exactly what you are doing. Would you still like to publish this service to the Internet? [ADVISED AGAINST]

The expected response is "yes" or "no".

A "filemaker" service has been identified on port 5003. This service has not been formally recognized and we would advise you against publishing it to the Internet, unless you know exactly what you are doing. Would you still like to publish this service to the Internet? [ADVISED AGAINST]

The expected response is "yes" or "no".

The examples that have just been presented illustrate one way among many of validating, to the administrator, the relevance of the configuration rules generated based on the characteristic information of the user equipment UE, collected by the access equipment AP.

It is now considered that the user equipment UE is connected to the local area network LAN.

According to this embodiment of the invention, the obtaining of characteristic information of the user equipment UE is triggered periodically by the device 100, for example every hour. For example, the module for analyzing ports of the access equipment regularly transmits connection requests to a plurality of ports of the user equipment UE that are reserved for known software applications (for example 80 for http, 443 for https). With each of the ports opened by the user equipment UE, it establishes a communication session for example in accordance with the TCP (for "Transmission Control Protocol") communication protocol and asks to obtain information about the application published to this port (using a GET request). In addition to the information according to which the port is open, it generally obtains, in response, a name and a version number of the application in question. According to another embodiment, the device 100 listens to the data traffic to and from the user equipment UE in order to identify connections to a port of this equipment for which it might not yet have configured the firewall.

This regular triggering of the collection 21 of characteristic information IC makes it possible to monitor the user equipment and to detect changes in its behavior.

To this end, the device 100, at 22, compares the current characteristic information ICC with the reference characteristic information ICR stored in memory for this user equipment UE, for example in a structured file as described above.

Advantageously, it checks whether the same services are described in the two files and, in the event of a difference being observed, whether this difference corresponds to the launching of a new service or to the closure of a service present during the last collection of characteristic information.

It may also detect, for one and the same service, whether it has changed by comparing the version numbers of this software.

Advantageously, if a difference is observed, the device 100 generates new configuration rules at 23, possibly submits them for validation to the administrator at 24 and transmits a configuration update command to the firewall FW at 25. At 26, it stores the current characteristic information in memory as new reference characteristic information ICR.

With reference to FIG. 4, a presentation is given of a method for updating a configuration of a firewall equipment in a local area communication network managed by an access equipment according to one embodiment of the invention. Advantageously, this method is implemented by the firewall equipment FW.

At 40, a configuration command message CC is received by the firewall equipment FW from the device 100. This message comprises a plurality of configuration rules VCR for configuring the firewall equipment FW that are generated by the device 100 following the detection of the presence of a new user equipment in the local area communication network LAN. Advantageously, when the device 100 and the firewall equipment FW are both integrated into the access equipment AP, they communicate and exchange data in accordance with an IPC (for "Inter-Process Communication") mechanism. Of course, the invention is not limited to this example, and any other means of communication between various components or modules of one and the same access equipment that is known per se may possibly be implemented.

At 41, the plurality of configuration rules for configuring the firewall equipment is extracted from the message CC and stored in a memory of the firewall equipment FW. For example, such a memory M2 comprises a table TC of applicable configuration rules, and the extracted configuration rules are stored in this table TC in association with an identifier of the user equipment, for example its MAC connection address. They are then applied by the firewall equipment to the active interfaces of the new user equipment UE.

A description is now given, with reference to FIG. 5, of the message flows exchanged between the configuration device 100 for configuring a firewall equipment FW in a local area communication network managed by an access equipment AP for accessing a wide area communication network WAN, the firewall equipment FW, the new user equipment UE that has just connected to the local area network LAN and the user equipment UEA of the administrator AD of the local area network. Upon arriving in the local area network LAN, the client equipment UE is detected by the access equipment AP, which informs the configuration device 100 of this at 20. For example, the access equipment AP comprises a DHCP server module (not shown) and detects the IP address assignment request DHCP-REQUEST received by the DHCP server from the user equipment UE, or else the router module RT detects a new entry in an ARP association table between the MAC address and the IP address of the user equipment in the network, or else a request to connect to the network from a new IP address.

At 21, the device 100 obtains characteristic information IC of this new user equipment by analyzing its active interfaces in the local area network LAN. Advantageously, it obtains this information from the access equipment AP, which has access to the network event journals of these various modules and sees the data traffic from and to the client equipment. For greater accuracy, it may also listen to the data traffic for a predetermined time period in order to obtain additional information about use of these services, by which IP addresses, etc.

Based on the obtained characteristic information, it deduces the nature of the user equipment (consumer or business equipment), its function (server, hard drive, telephone, camera, etc.), the client and server software that it is implementing and the ports on which it is accessible.

Advantageously, it applies a configuration policy so as to automatically define, at 23, configuration rules suited to the service under consideration on the basis of the nature of the user equipment, of its function and of the effective use of this service. For example, in natural language, an automatic configuration rule dictated by the configuration policy in force for an "Airplay" service on a consumer user equipment might be expressed as follows: "an Airplay service has been published to the local area network and has not been published to the Internet". A plurality of configuration rules CR are generated in a language and in a format understandable to the firewall equipment FW, for example of the type iptable.

In this exemplary embodiment, a guided configuration mode is implemented, that is to say that the plurality of obtained rules are submitted for validation to the administrator AD of the network LAN at 24. For example, the device 100 translates the configuration rules CR into the same number of questions expressed in natural language. They are asked successively to the administrator via the interface of an API installed on his user equipment UE(AD). Based on the received responses, the configuration rules are adjusted and validated configuration rules VCR are obtained and stored in memory. They are transmitted, at 25, by the device 100 to the firewall equipment FW in a configuration command message CC. At 26, the characteristic information IC is stored in memory in the form of reference characteristic information ICR, for example in a file structured in accordance with a data model suitable in particular for describing each of the services running on the user equipment UE. The firewall FW receives this message at 40, extracts the validated configuration rules and updates its configuration at 41, for example by storing the received rules VCR in its table TIC of applicable rules.

After a predetermined time period, for example of one hour, the device 100 again triggers the obtaining 21 of characteristic information, called current ICC, for the user equipment UE. It compares said information, at 22, with the reference characteristic information ICR stored in memory. In the event of a difference being observed, it updates the configuration rules for configuring the firewall at 23. For example, in the event of a new service being detected, it adds a rule and transmits it, at 25, to the firewall equipment FW, possibly after validation with an administrator of the local area network LAN at 24. In the event of a closed service, it transmits a command to erase the one or more configuration rules relating to this service to the firewall equipment at 25. As an alternative, the device 100 generates new configuration rules based on the new current information ICC, stores them in memory at 26, possibly has them validated at 24 by the administrator AD of the network LAN and transmits them to the firewall equipment FW at 25 so that it replaces the rules currently applied for the user equipment with these new rules.

A presentation is now given, with reference to FIG. 6, of one example of a hardware structure of a configuration device 100 for configuring a firewall equipment in a communication network according to the invention, comprising at least a detection module for detecting a user equipment, an obtaining module for obtaining characteristic information of this user equipment by analyzing its active interfaces in the network, a generation module for generating a plurality of configuration rules based on the obtained characteristic information and on a predetermined configuration policy and a transmission module for transmitting a configuration command to the user equipment UE comprising the plurality of configuration rules. Advantageously, the device 100 furthermore comprises a validation module for validating the plurality of rules with an administrator AD of the local area network, a storage module for storing the characteristic information in memory in the form of reference characteristic information and a comparison module for comparing the obtained characteristic information with the reference characteristic information.

The term "module" may correspond equally to a software component or to a hardware component or to a set of software and hardware components, a software component itself corresponding to one or more computer programs or subroutines or, more generally, to any element of a program able to implement a function or a set of functions.

More generally, such a device 100 comprises a random-access memory 103 (for example a RAM memory), a processing unit 102 equipped for example with a processor, and controlled by a computer program Pg1, representative of the detection, obtaining, comparison, storage, generation, validation and transmission modules, stored in a read-only memory 101 (for example a ROM memory or a hard drive). On initialization, the code instructions of the computer program are for example loaded into the random-access memory 103, before being executed by the processor of the processing unit 102. The random-access memory 103 may also contain a table TC comprising records associating the plurality of generated and possibly validated configuration rules with an identifier of the user equipment UE.

FIG. 6 illustrates only one particular way, out of several possibilities, of producing the device 100 so that it carries out the steps of the method for configuring a firewall equipment in a local area communication network LAN as described above with reference to FIGS. 2 and 5 in its various embodiments. Specifically, these steps may be performed indiscriminately on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

If the device 100 is formed with a reprogrammable computing machine, the corresponding program (that is to say the sequence of instructions) may be stored in a removable storage medium (such as for example a floppy disk, a CD-ROM or a DVD-ROM) or a non-removable storage medium, this storage medium being able to be read partly or fully by a computer or a processor.

The various embodiments have been described above with reference to a device 100 integrated into an access equipment AP for accessing a wide area communication network WAN and configured so as to manage the local area communication network LAN. This is for example a home gateway or business gateway, a network of sensors or IoT (for "Internet of Things"), a Wi-Fi access point or even a Wi-Fi repeater.

According to one variant, the device 100 is based on the hardware structure of the access equipment AP, which here has the hardware structure of a computer and comprises, more particularly, a processor, a random-access memory, a read-only memory, a non-volatile flash memory, and a routing module for routing data between the local area communication network and the wide area communication network. Advantageously, the firewall equipment FW is itself integrated into the access equipment AP. For example, the means of communication between the device 100 and the firewall equipment FW are of inter-process type IPC. The read-only memory constitutes a recording medium according to the invention, able to be read by the processor and on which there is recorded the computer program Pg1 according to the invention, including instructions for executing the method for configuring a firewall equipment according to the invention.

Lastly, with reference to FIG. 7, a presentation is given of one example of a hardware structure of a firewall equipment FW connected to a local area communication network LAN managed by an access equipment AP for accessing a wide area communication network according to the invention, comprising at least a reception module for receiving a configuration command from the configuration device 100 according to the invention, comprising a plurality of configuration rules VCR and an update module for updating its configuration on the basis of the plurality of received rules. The term "module" may correspond equally to a software component or to a hardware component or to a set of software and hardware components, a software component itself corresponding to one or more computer programs or subroutines or, more generally, to any element of a program able to implement a function or a set of functions.

More generally, such a device 200 comprises a random-access memory 203 (for example a RAM memory), a processing unit 202 equipped for example with a processor, and controlled by a computer program Pg2, representative of the reception and update modules, stored in a read-only memory 201 (for example a ROM memory or a hard drive). On initialization, the code instructions of the computer program are for example loaded into the random-access memory 203, before being executed by the processor of the processing unit 202.

FIG. 7 illustrates only one particular way, out of several possibilities, of producing the device 200 so that it carries out the steps of the method for processing a configuration command, with reference to FIGS. 4 and 5 in its various embodiments. Specifically, these steps may be performed indiscriminately on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

If the firewall FW is formed with a reprogrammable computing machine, the corresponding program (that is to say the sequence of instructions) may be stored in a removable storage medium (such as for example a floppy disk, a CD-ROM or a DVD-ROM) or a non-removable storage medium, this storage medium being able to be read partly or fully by a computer or a processor.

The various embodiments have been described above with reference to a firewall FW integrated into an access equipment AP, but the firewall equipment FW may also be independent of the access equipment AP.

The invention that has just been described in its various embodiments has numerous advantages. In particular, it proposes a novel solution for the automatic and customized configuration of a firewall equipment in a first communication network managed by an access equipment for accessing a second wide area communication network, which learns the features of this new user equipment by analyzing its active interfaces and the data traffic transiting through them, and then uses them to generate configuration rules in accordance with a predetermined configuration policy or model. These rules may be submitted for validation to an administrator of the network or else transmitted directly to the firewall so that it updates itself.

Once this configuration has been performed, the invention furthermore proposes to regularly monitor the user equipment so as to detect a change in its behavior and adapt the configuration of the firewall accordingly.

The administrator of the network is thereby assisted in terms of configuring his network, thereby making this operation accessible to everyone, regardless of his level of computing knowledge, while at the same time guaranteeing a bolstered security level and an improved quality of service for users of this network.

The invention claimed is:

1. A method for configuring a firewall equipment in a first communication network managed by an access equipment for accessing a second communication network, wherein the method implements:
obtaining characteristic information of a user equipment in said first communication network by analyzing active interfaces of the user equipment in said first communication network;
generating at least one configuration rule for configuring the firewall equipment on the basis of the obtained characteristic information and of a predetermined configuration model; and
transmitting, to the firewall equipment, an update command message to update a configuration of the firewall equipment, comprising said at least one generated configuration rule.

2. The method for configuring a firewall equipment as claimed in claim 1, wherein the obtaining of the characteristic information is triggered upon detecting arrival of the user equipment in the first communication network.

3. The method for configuring a firewall equipment as claimed in claim 1, wherein the obtaining of the characteristic information of the user equipment, called current characteristic information, is triggered regularly.

4. The method for configuring a firewall equipment as claimed in claim 1, wherein the characteristic information of at least one active interface of the user equipment in the first communication network comprises at least one item of information representative of server software, called service, executed by said user equipment on said active interface and of a port opened by said service, and wherein the generated configuration rule defines the network, from among the first communication network and the second communication network, on which the service is made accessible.

5. The method for configuring a firewall equipment as claimed in claim 4, wherein said obtained characteristic information furthermore comprises at least one network address that has accessed said service, and wherein the generated configuration rules comprise a network address filtering rule determined on the basis of the predetermined configuration model and of said network address.

6. The method for configuring a firewall equipment as claimed in claim 1, wherein the method comprises preliminary validation of the generated configuration rules with an administrator of the first communication network before the generated configuration rules are transmitted to the firewall equipment.

7. The method for configuring a firewall equipment as claimed in claim 1, wherein the method implements storage of the characteristic information obtained for the user equipment in memory in the form of reference characteristic information.

8. The method for configuring a firewall equipment as claimed in claim 1, wherein the method implements a comparison of the obtained characteristic information, called current characteristic information, with previously-obtained and stored characteristic information, called reference characteristic information, and wherein the generation of configuration rules is triggered upon detecting a difference between the current characteristic information and the reference characteristic information.

9. The method for configuring a firewall equipment as claimed in claim 8, wherein, in response to the difference relating to characteristic information representative of activation of a new interface, at least one additional configuration rule relating to said active new interface is generated and wherein the update command message comprises said at least one additional rule.

10. The method for configuring a firewall equipment as claimed in claim 8, wherein, in response to the difference relating to characteristic information representative of deactivation of an interface, the update command message comprises a command to erase the at least one configuration rule relating to the deactivated interface.

11. A method for updating a configuration of a firewall equipment in a first communication network managed by an access equipment for accessing a second communication network, wherein the method comprises the following, implemented by the firewall equipment:
receiving an update command message to update a configuration of the firewall equipment, comprising at least one configuration rule associated with a user equipment present in the first communication network; and
updating the configuration of the firewall equipment in accordance with the received command;
wherein said at least one configuration rule of said user equipment is based on characteristic information of said user equipment and on a predetermined configuration model, said characteristic information of said user equipment having been obtained by the access equipment by analyzing active interfaces of said user equipment.

12. A configuration device for configuring a firewall equipment in a first communication network managed by an access equipment for accessing a second communication network, wherein the configuration device comprises at least one processor configured so as to:
obtain characteristic information of a user equipment connected to the first communication network by analyzing active interfaces of the user equipment in the first communication network; and
generate at least one configuration rule for configuring the firewall equipment on the basis of the obtained characteristic information and of a predetermined configuration model; and transmit, to the firewall equipment, an update command message to update a configuration of the firewall equipment, comprising said at least one generated configuration rule.

13. The configuration device as claimed in claim 12, wherein the configuration device is comprised in an access equipment for accessing a wide area communication network, configured so as to manage the first communication network.

14. The configuration device as claimed in claim 13, wherein the configuration device comprises the firewall equipment.

15. A firewall equipment in a first communication network managed by an access equipment for accessing a second communication network, wherein the firewall equipment comprises at least one processor configured so as to:
   receive an update command message to update a configuration, comprising at least one configuration rule associated with a user equipment present in the first communication network; and
   update the configuration of the firewall equipment in accordance with the received configuration rules;
   wherein said at least one configuration rule of said user equipment is based on characteristic information of said user equipment and on a predetermined configuration model, said characteristic information of said user equipment having been obtained by the access equipment by analyzing active interfaces of said user equipment.

16. A non-transitory computer-readable medium comprising program code instructions stored thereon for implementing a method for configuring a firewall equipment in a first communication network when the instructions are executed by a processor of a configuration device, wherein the first communication network is managed by an access equipment for accessing a second communication network, and wherein the instructions configure the configuration device to:
   obtain characteristic information of a user equipment in said first communication network by analyzing active interfaces of the user equipment in said first communication network;
   generate at least one configuration rule for configuring the firewall equipment on the basis of the obtained characteristic information and of a predetermined configuration model; and
   transmit, to the firewall equipment, an update command message to update a configuration of the firewall equipment, comprising said at least one generated configuration rule.

* * * * *